United States Patent [19]

Muramori et al.

[11] Patent Number: 4,603,155

[45] Date of Patent: Jul. 29, 1986

[54] ALKENYL AROMATIC COMPOUND-CONJUGATED DIENE BLOCK COPOLYMER AND PROCESS FOR THE PRODUCTION THEREOF

[75] Inventors: Kunihiko Muramori; Kazuo Yamamoto; Noboru Oshima; Yoshito Yoshimura, all of Tokyo, Japan

[73] Assignee: Japan Synthetic Rubber Co., Ltd., Tokyo, Japan

[21] Appl. No.: 586,442

[22] Filed: Mar. 5, 1984

[30] Foreign Application Priority Data

Mar. 10, 1983 [JP] Japan .................................. 58-38342
Oct. 13, 1983 [JP] Japan ................................ 58-189985

[51] Int. Cl.$^4$ ........................................... C08F 293/00
[52] U.S. Cl. .................................... 525/314; 525/250; 525/271; 525/316
[58] Field of Search ................... 525/271, 314, 250

[56] References Cited

U.S. PATENT DOCUMENTS

| 3,906,058 | 9/1975 | Durst | 525/314 |
| 4,104,330 | 8/1978 | Danzig et al. | 525/271 |
| 4,152,370 | 5/1979 | Moczygemba | 525/314 |
| 4,304,881 | 12/1981 | Aoki et al. | 525/314 |
| 4,335,221 | 6/1982 | Gerberding | 525/314 |
| 4,390,663 | 6/1983 | Nicholson | 525/314 |

*Primary Examiner*—Wilbert J. Briggs, Sr.
*Attorney, Agent, or Firm*—Oblon, Fisher, Spivak, McClelland & Maier

[57] ABSTRACT

An alkenyl aromatic compound-conjugated diene block copolymer having a combined alkenyl aromatic compound content of 25-95% by weight, characterized in that said copolymer is represented by the formula,

A—B—A wherein A represents an alkenyl aromatic compound polymer block, the total amount of A's in both ends being 50-97% by weight of the total combined alkenyl aromatic compound content; B represents a conjugated diene-alkenyl aromatic compound copolymer block, said B portion having (a) 2-10 taper blocks where the amount of the alkenyl aromatic compound increases gradually and (b) a weight ratio of alkenyl aromatic compound/conjugated diene of 3-85/97-15; and the total amount of the chains that 1-4 alkenyl aromatic compound monomers are linked is 5-30% by weight of the total combined alkenyl aromatic compound content. Said copolymer is excellent in the balance of impact strength, tensile strength and elongation.

19 Claims, 3 Drawing Figures

ALKENYL AROMATIC COMPOUND-CONJUGATED DIENE BLOCK COPOLYMER AND PROCESS FOR THE PRODUCTION THEREOF

BACKGROUND OF THE INVENTION

This invention relates to a novel alkenyl aromatic compound-conjugated diene block copolymer, and more particularly to a block copolymer having an excellent balance of impact strength, tensile strength and elongation which copolymer has non-elastomeric alkenyl aromatic compound blocks at both ends and an elastomeric alkenyl aromatic compound-conjugated diene copolymer block comprising mainly the conjugated diene at the center, and a process for the production thereof.

In the field of modification of polystyrene, a demand has recently increased for a thermoplastic elastomer having an excellent balance of tensile strength and elongation, and for a transparent, thermoplastic resin having an excellent balance of impact strength, tensile strength and elongation from both aspects of sense and practical use.

A block copolymer comprising a vinyl aromatic compound and a conjugated diene is well known, and is disclosed in, for example, Japanese Patent Publication Nos. 28915/72, 3252/72, 2423/73 and 20038/73. However, block copolymers obtained by these methods are still unsatisfactory in respect of the balance of impact strength, tensile strength and elongation.

The present inventors have earnestly conducted research for the purposes of obtaining a clock copolymer having an excellent balance of impact strength, tensile strength and elongation. As a result thereof, it has been found that the specific block structure can meet the above purpose.

SUMMARY OF THE INVENTION

According to this invention, there is provided an alkenyl aromatic compound-conjugated diene block copolymer having a combined alkenyl aromatic compound content of 25-95% by weight, characterized in that the said block copolymer is represented by the formula,

A—B—A wherein A represents an alkenyl aromatic compound polymer block, the total amount of A's in both ends being 50-97% by weight of the total combined alkenyl aromatic compound content; B represents a conjugated diene-alkenyl aromatic compound copolymer block, said B portion having (a) 2-10 taper blocks where the amount of the alkenyl aromatic compound increases gradually and (b) a weight ratio of alkenyl aromatic compound/conjugated diene of 3-85/97-15; and the total amount of the chains that 1-4 alkenyl aromatic compound monomers are linked is 5-30% by weight of the total combined alkenyl aromatic compound content.

The block copolymer according to this invention contains the alkenyl aromatic compound in an amount of 25-95% by weight, preferably 28-90% by weight. If the amount of the alkenyl aromatic compound is too small, the tensile strength and hardness of the copolymer are low; if it is too large, the elongation and impact strength thereof are inferior.

In the region that the alkenyl aromatic compound content is low, the block copolymer of this invention is in the form of an elastomer, and in the region that the said content is high, it is in the form of a resin.

In this invention, the amount of the alkenyl aromatic compound is preferably 25-55% by weight, more preferably 28-50% by weight, in order to obtain the block copolymer in the form of an elastomer. If the amount of the alkenyl aromatic compound is less than 25% by weight, the tensile strength is insufficient; if it is too large, the elongation is insufficient. In order to obtain a block copolymer in the form of a resin, the amount of the alkenyl aromatic compound is preferably more than 55% by weight and not more than 95% by weight, more preferably 60-90% by weight. If the amount of the alkenyl aromatic compound is 55% by weight or less, the hardness is unsatisfactory, and if it exceeds 95% by weight, the impact strength is not enough.

The characteristic feature of the block copolymer of this invention consists in a copolymer represented by the general formula, A—B—A, in which the B portion has an alkenyl aromatic compound content in a specific range and a taper block number in a specific range, said block copolymer having a chain distribution of the alkenyl aromatic compound in a specific range. By these characteristic features, the balance of tensile strength and elongation is remarkably improved, and in the case of a block copolymer in the form of a resin, the resulting copolymer is transparent and excellent in impact strength.

The combined alkenyl aromatic compound content in the B portion of the block copolymer according to this invention is 3-85% by weight, preferably 5-60 percent by weight, and more preferably 5-55% by weight.

Above all, in order to obtain a block copolymer in the form of an elastomer, the combined alkenyl aromatic compound content in the B portion of the block copolymer is preferably 3-15% by weight, more preferably 5-10% by weight, and the combined alkenyl aromatic compound content in the A portions is 50-97% by weight, preferably 70-97% by weight of the total combined alkenyl aromatic compound content. If the combined alkenyl aromatic compound content in the B portion is less than 3% by weight, the tensile strength is inferior, and if it exceeds 15% by weight, the elongation is inferior. Furthermore, the B portion comprises taper blocks wherein the combined alkenyl aromatic compound content increases gradually, and the number of the taper blocks is 2-10, preferably 3-10, and more preferably 3-7. The elongation is inferior if the number of the taper blocks is less than 2, and the tensile strength is inferior if it exceeds 10. In the chain distribution of alkenyl aromatic compound monomers in the block copolymer in the form of an elastomer, the amount of the chains that 1-4 alkenyl aromatic compound monomers are linked is 5-30%, preferably 15-30%, by weight of the total combined alkenyl aromatic compound content. The elongation is inferior if the amount of the chain having 4 or less of the monomers, is less than 5% by weight, and the tensile strength is inferior if it exceeds 30% by weight.

In order to obtain the block copolymer in the form of a resin, the combined alkenyl aromatic compound content in the B portion of the block copolymer is preferably 3-85% by weight, more preferably 10-55% by weight, the combined alkenyl aromatic compound content in the A portions is 50-97%, preferably 70-97%, and more preferably 75-95%, by weight of the total combined alkenyl aromatic compound content. The tensile strength is not enough if the combined alkenyl aromatic compound content in the B portion is less than 3% by weight, and the elongation is unsatisfactory if it exceeds 85% by weight. Furthermore, the B portion has taper blocks wherein the combined alkenyl aromatic compound content increases gradually, and the number of the taper blocks is 2–10, preferably 3–10. The elongation is inferior if the number of the taper blocks is less than 2, and the impact resistance and the tensile strength are inferior if it exceeds 10.

The chain distribution of alkenyl aromatic compound monomers in the block copolymer in the form of a resin is such that the amount of the chains that 1–4 alkenyl aromatic compound monomers are linked is preferably 5–25%, more preferably 10–20%, by weight of the total combined alkenyl aromatic compound content. The elongation is insufficient if the chain of 4 or less monomers is less than 5% by weight, and the impact strength is insufficient if it exceeds 25% by weight.

The block copolymer of this invention can be prepared by the following method:

To a hydrocarbon solvent is added an ether or a tertiary amine, and an organolithium compound is added as an initiator, after which (1) an alkenyl aromatic compound is added thereto in an amount of 8–45%, preferably 10–40%, by weight of the total amount of the monomer used, and polymerized, (2) after the polymerization reaction has been substantially completed, a mixture of 15–97% by weight of a conjugated diene and 3–85% by weight of the same alkenyl aromatic compound as in (1) is added in 2–10 portions, preferably 3–10, more preferably 3–7 portions and substantially completely polymerized every addition, and thereafter, if necessary, conjugated diene is added and polymerized, and (3) finally, the same alkenyl aromatic compound as in (1) is added in an amount of 8–45%, preferably 10–40%, by weight of the total amount of the monomer used, and polymerized.

Specifically, in order to obtain a block copolymer in the form of an elastomer, there may be used a method which comprises (1) polymerizing an alkenyl aromatic compound in a proportion of 8–40%, preferably 10–25%, by weight of the total amount of the monomer used, (2) adding, after the substantial completion of the polymerization reaction, a mixture of 85–97% by weight of a conjugated diene and 3–15% by weight of the same alkenyl aromatic compound as in (1) in 2–10 portions, preferably 3–10 portions, and polymerizing substantially completely the mixture every addition, and thereafter adding, if necessary, conjugated diene and polymerizing the same, and (3) finally adding the same alkenyl aromatic compound as in (1) in an amount of 8–40%, preferably 10–25%, by weight of the total amount of the monomer used, and polymerizing the same.

In order to obtain a block copolymer in the form of a resin, there may be used a method which comprises (1) polymerizing an alkenyl aromatic compound in a proportion of 20–45%, preferably 25–40%, by weight of the total amount of the monomer used, (2) adding, after the substantial completion of the polymerization reaction, a mixture of 15–97% by weight of a conjugated diene and 3–85% by weight of the same alkenyl aromatic compound as in (1) in 2–10 portions, preferably 3–10 portions, and polymerizing substantially completely the mixture every addition, and thereafter adding, if necessary, conjugated diene and polymerizing the same, and (3) finally adding the same alkenyl aromatic compound as in (1) in a proportion of 20–45%, preferably 25–40%, by weight of the total amount of the monomer used and polymerizing the same.

In the above-mentioned step of adding a mixture of a conjugated diene and the same alkenyl aromatic compound as in the (1) step in 2–10 portions and polymerizing substantially completely the mixture every addition, it is preferred that the amount of the monomer used every addition is in the same level, and it is desirable to polymerize 100% the monomer used every addition. The method of adding the monomers in 2–10 portions includes the addition of the monomer mixture or the simultaneous addition of the conjugated diene and the alkenyl aromatic compound.

A copolymer of an alkenyl aromatic compound and a conjugated diene having a preferable chain distribution of the alkenyl aromatic compound is obtained by the polymerization in a hydrocarbon solvent having added thereto an ether or a tertiary amine. If an ether or a tertiary amine is added, the amount of the chains that 1–4 alkenyl aromatic compound monomers are linked is increased. The amount of the chains is preferably 5–30%, more preferably 10–30%, by weight of the amount of the alkenyl aromatic compound. If the amount of the chains is less than 5% by weight, the elongation is unsatisfactory, and if it exceeds 30% by weight, the tensile strength and the impact strength are insufficient.

From the viewpoint of controlling the chain distribution of the alkenyl aromatic compound, the amount of an ether or a tertiary amine used is preferably in a proportion of 0.005–5 parts, more preferably 0.005–0.5 part, by weight per 100 parts by weight of the monomers.

The alkenyl aromatic compound used in this invention includes styrene, α-methylstyrene, p-methylstyrene, m-methylstyrene, o-methylstyrene, p-tertbutylstyrene, dimethylstyrene, vinylnaphthalene and the like, among which styrene is preferred. However, they may be used in admixture of two or more. The conjugated diene includes butadiene, isoprene, piperylene and the like, among which butadiene is preferred however, they may be used in admixture of two or more.

The weight average molecular weight of the block copolymer of this invention is preferably 10,000–800,000, more preferably 50,000–500,000. Of this weight average molecular weight, the weight average molecular weight of the A portions is preferably 3,000–150,000, and the weight average molecular weight of the B portion is preferably 5,000–340,000. Particularly in the case of the block copolymer in the form of an elastomer, the weight average molecular weight of the A portions is preferably 3,000–80,000, and the weight average molecular weight of the B portion is preferably 44,000–340,000. In the case of the block copolymer in the form of a resin, the weight average molecular weight of the B portion is preferably 5,000–200,000, and that of the A portion is preferably 3,000–150,000.

The block copolymer of this invention can be prepared by either an isothermal polymerization process or an adiabatic polymerization process. The range of the polymerization temperature is preferably from 30° to 120° C.

The hydrocarbon solvent used for the production of the block copolymer of this invention include, for example, cyclopentane, cyclohexane, benzene, ethylbenzene, xylene, and mixtures of one of these solvents with pentane, hexane, heptane, butane or the like.

As the organolithium compound, there may be used, for example, n-butyllithium, sec-butyllithium, tert-butyllithium, n-hexyllithium, iso-hexyllithium, phenyllithium, naphthyllithium or the like. The amount of the organolithium compound used is preferably 0.04–1.0 part by weight per 100 parts by weight of the monomers.

As the ether or the tertiary amine, there may be used, for example, tetrahydrofuran, diethyl ether, anisole, dimethoxybenzene, ethylene glycol dimethyl ether, triethylamine, N-dimethylaniline, pyridine or the like.

The block copolymer of this invention can be used alone, or if necessary, in admixture with a plastics material such as polystyrene; a styrene copolymer, such as styreneMMA copolymer, styrene-acrylonitrile copolymer or the like; a graft copolymer, such as ABS resin or the like; a polyolefin, such as polyethylene, polypropylene, or the like; polyvinyl chloride; polyvinyl acetate; a polyester; a polyether; polyacetal; a polycarbonate; or the like or with a rubber such as 1,2-polybutadiene, BR, SBR, NBR, EPR or the like. These mixtures can be used for injection molding articles such as food containers, foot-wears and the like; flow-molded articles such as toys, articles for daily use and the like; and compression-molded articles such as automobile parts, electric device parts, packings, sheets, plates and the like.

Furthermore, the block copolymers of this invention may be effectively used also as adhesives, because they are soluble in the hydrocarbon solvent. In addition, the block copolymers of this invention may be also used for altering the physical properties of the other rubbers such as SBR, NBR and the like and plastics such as polystyrene and the like. For instance, the use thereof as a rubber includes the production of crepe sponges and the use thereof as a plastics material includes an improving agent of impact resistance and the like of a general-use polystyrene. And they can also be foamed for various uses.

DETAILED DESCRIPTION OF THE INVENTION

Figure 1:
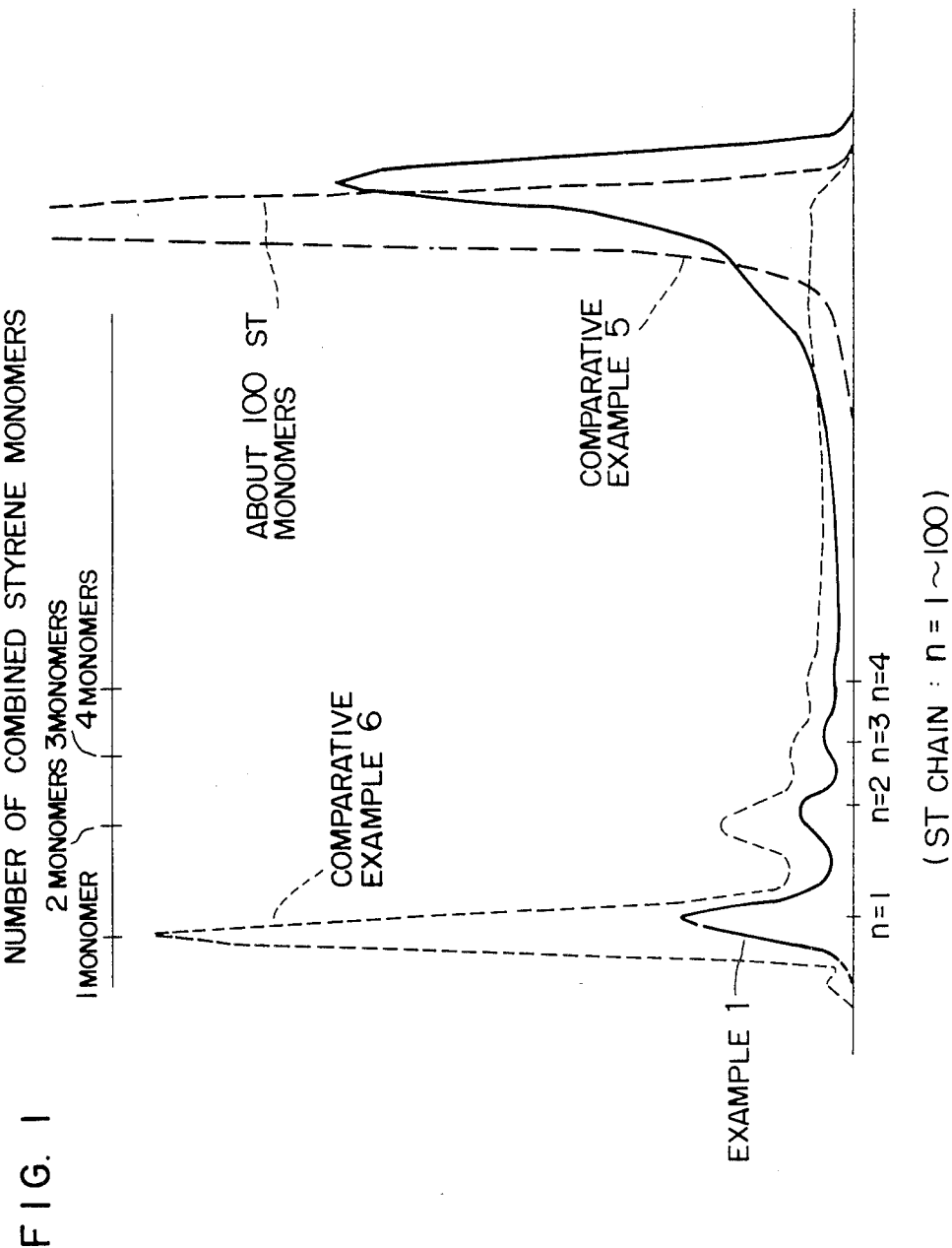
Figure 2:
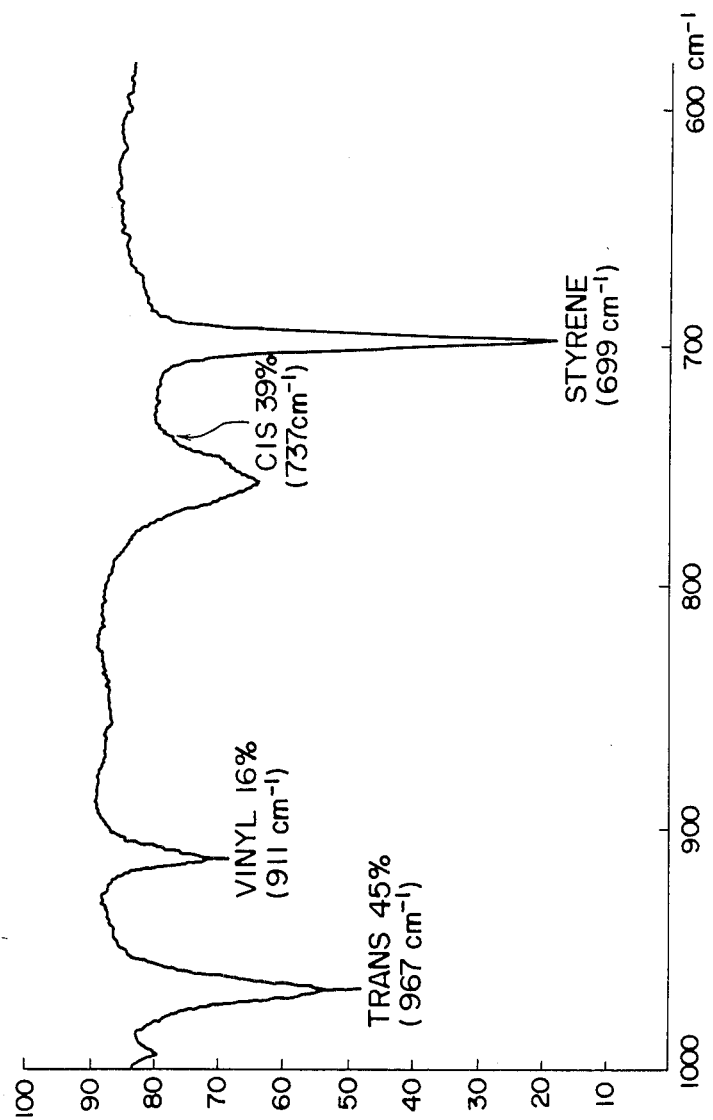
Figure 3:
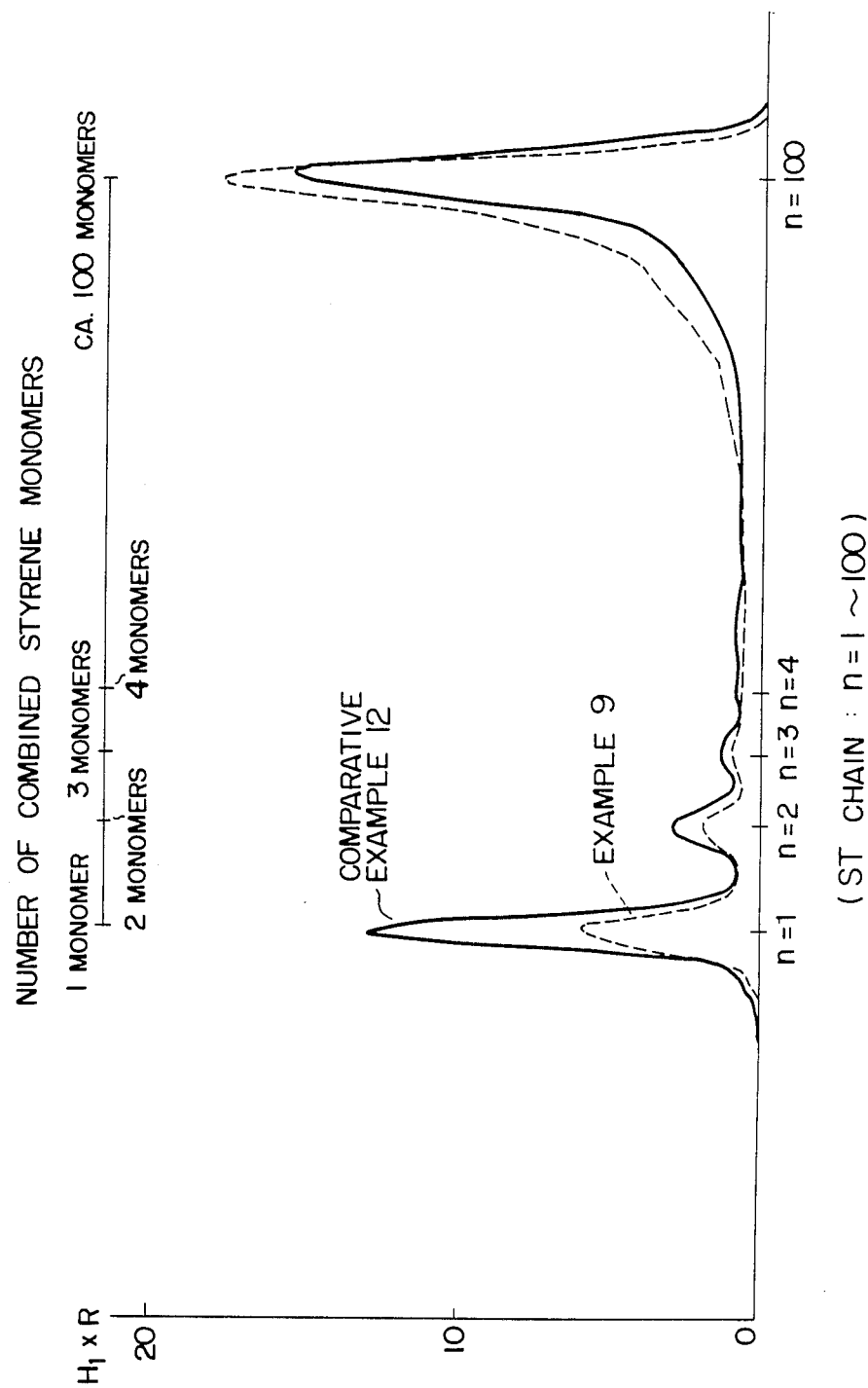

This invention is further illustrated in detail referring to Examples, Comparative Examples and the accompanying drawings. In the accompanying drawings, FIG. 1 shows the styrene chain distribution curves obtained by gel-permeation chromatography of the copolymers obtained in Example 1, Comparative Example 5 and Comparative Example 6, said curves having been obtained by a method of oxidative degradation with ozone, FIG. 2 shows the infrared absorption spectrum of the copolymer obtained in Example 9, and FIG. 3 shows the chain distribution curve of the copolymer obtained in Example 9 and Comparative Example 12.

Further, various measurements were carried out by the following methods.

In respect of the block copolymers in the form of an elastomer (Examples 1–8, Comparative Examples 1–9), tensile strength ($T_B$) and elongation ($E_B$) were measured according to JISK 6301.

In respect of the block copolymers in the form of a resin (Examples 9 et seq. and Comparative Examples 10 et seq.), impact strength, tensile strength and elongation were measured according to JISK 6871.

Transparency test was based upon ASTM D-1003.

Styrene chains were measured according to the method developed by Professor Tanaka et al., the Tokyo University of Agriculture and Technology (Abstracts of Polymer Society, Japan, Vol. 29, No. 7, page 2055).

Hardness was measured on R scale according to ASTM D-785.

The total amount of styrene was measured by infrared spectroscopy.

EXAMPLE 1

Into an autoclave provided with a stirrer and a jacket, which had been washed and dried, were charged 4,500 g of cyclohexane and 1 g of tetrahydrofuran under a nitrogen atmosphere, after which the interior temperature of the autoclave was raised to 70° C.

Subsequently, to the mixture obtained was added a hexane solution of 0.5 g of n-butyllithium, whereafter 130 g of styrene was added and polymerized at 70° C. for 60 minutes. The conversion of styrene was 100%.

Subsequently, a mixture of 15 g of styrene and 115 g of butadiene was added, and the polymerization was carried out at 70° C. for 60 minutes. The conversions of styrene and butadiene were 100%. This operation concerning the mixture addition was further repeated twice. Subsequently, 115 g of butadiene was added, and the polymerization was carried out at 70° C. until the conversion reached 100%. Then, 130 g of styrene was further added, and polymerization was carried out for 60 minutes. The conversion was 100%.

The temperature was controlled during the polymerization so that it was always kept at 70° C. After completion of the polymerization, 2,6-di-tert-butyl-p-cresol was added to the polymer solution, after which cyclohexane was removed by heating, thereby obtaining a block copolymer.

EXAMPLES 2–8, COMPARATIVE EXAMPLES 1–10

Polymerization was carried out with the same recipe as in Example 1 under the same conditions as in Example 1, except that styrene, butadiene and tetrahydrofuran were used in the amounts shown in Table 1. The results obtained are shown in Table 2.

TABLE 1

| | Styrene (g) | | | Amount of butadiene (g) | Amount of tetra-hydrofuran (g) | Number of additions of monomer in the B portion |
| --- | --- | --- | --- | --- | --- | --- |
| | Initial styrene content in A portion | Styrene content in B portion | Post-added styrene content in A portion | | | |
| Example | | | | | | |
| 1 | 130 | 45 | 130 | 460 | 1 | 4 |
| 2 | 145 | 15 | 145 | 460 | 1 | 4 |
| 3 | 123 | 60 | 123 | 460 | 1 | 4 |
| 4 | 130 | 48 | 130 | 462 | 1 | 7 |
| 5 | 95 | 45 | 95 | 536 | 1 | 4 |
| 6 | 175 | 30 | 175 | 380 | 1 | 4 |
| 7 | 130* | 45* | 130* | 460 | 1 | 4 |

TABLE 1-continued

|  | Styrene (g) | | Post-added styrene content in A portion | Amount of butadiene (g) | Amount of tetra-hydrofuran (g) | Number of additions of monomer in the B portion |
|---|---|---|---|---|---|---|
|  | Initial styrene content in A portion | Styrene content in B portion | | | | |
| Comparative Example | | | | | | |
| 1 | 65 | 24 | 65 | 612 | 1 | 4 |
| 2 | 208 | 45 | 208 | 305 | 1 | 4 |
| 3 | 300 | 6 | 300 | 460 | 1 | 4 |
| 4 | 96 | 114 | 96 | 460 | 1 | 4 |
| 5 | 130 | 45 | 130 | 460 | 0 | 4 |
| 6 | 130 | 45 | 130 | 460 | 50 | 4 |
| 7 | 130 | 45 | 130 | 460 | 1 | 2 |
| 8 | 130 | 45 | 130 | 460 | 1 | 20 |

Note:
*p-Methylstyrene was used in place of styrene.

TABLE 2

|  | Proportion of styrene chains of n being 1 to 4 (%) | Combined styrene content in B portion (%) | Total combined styrene content (%) | Molecular weight of A portion ($\times 10^4$) | Molecular weight of B portion ($\times 10^4$) | Tensile strength (kg/cm$^2$) | Elongation (%) |
|---|---|---|---|---|---|---|---|
| Example | | | | | | | |
| 1 | 22 | 9 | 40 | 1.8 | 7.2 | 180 | 1,000 |
| 2 | 26 | 3 | 40 | 2.1 | 6.8 | 243 | 950 |
| 3 | 19 | 12 | 40 | 1.7 | 7.4 | 165 | 1,050 |
| 4 | 27 | 9 | 40 | 1.8 | 7.3 | 174 | 1,100 |
| 5 | 21 | 8 | 30 | 1.4 | 8.3 | 156 | 1,200 |
| 6 | 23 | 7 | 50 | 2.5 | 5.9 | 320 | 850 |
| 7 | 22 | 9 | 40 | 1.8 | 7.2 | 182 | 1,000 |
| Comparative Example | | | | | | | |
| 1 | 24 | 4 | 20 | 0.9 | 9.1 | 127 | 1,100 |
| 2 | 25 | 13 | 60 | 2.9 | 4.9 | 335 | 700 |
| 3 | 21 | 1 | 40 | 4.3 | 6.7 | 273 | 750 |
| 4 | 24 | 20 | 40 | 1.4 | 8.2 | 138 | 800 |
| 5 | 0 | 9 | 40 | 1.8 | 9.1 | 135 | 1,100 |
| 6 | 67 | 9 | 40 | 1.8 | 9.1 | 125 | 1,000 |
| 7 | 19 | 9 | 40 | 1.8 | 9.1 | 175 | 800 |
| 8 | 23 | 9 | 40 | 1.8 | 9.1 | 146 | 950 |

Examples 2 and 3: Examples wherein the combined styrene contents in the B portion were 3% and 12%, respectively.

Example 4: Example wherein the monomer in the B portion was added 7 times.

Examples 5 and 6: Examples wherein the total combined styrene contents were 30% and 50%, respectively.

Example 7: Example wherein para-methylstyrene was used in place of styrene.

Comparative Examples 1 and 2: Examples wherein the total combined styrene contents were 20% and 60%, respectively.

Comparative Examples 3 and 4: Examples wherein the combined styrene content in the B portion were 1% and 20%, respectively.

Comparative Examples 5 and 6: Examples of no addition of tetrahydrofuran and addition of a great excess of tetrahydrofuran (6.5 g/100 g of monomer), respectively.

Comparative Examples 7 and 8: Examples wherein the monomer in the B portion was added twice and 20 times, respectively.

Comparative Examples 2 and 4 do fall within broad terms of the invention, but they are comparataive in the context of trying to prepare an elastomer.

The block copolymers in Examples 1–7 are excellent in the balance of tensile strength and elongation as compared with those in Comparative Examples 1–8.

FIG. 1 shows the distribution curves of styrene chains by the oxidative degradation method using ozone which has been developed by Tanaka et al. as regards the copolymers in Example 1, Comparative Example 5 and Comparative Example 6.

The results shown in Table 3 are obtained from FIG. 1.

TABLE 3

|  | Length of styrene chain | | | | |
|---|---|---|---|---|---|
|  | n = 1 | n = 2 | n = 3 | n = 4 | n > 5 |
| Example 1 | 14% | 4 | 3 | 1 | 78 |
| Comparative Example 5 | 0 | 0 | 0 | 0 | 100 |
| Comparative Example 6 | 46 | 10 | 7 | 4 | 33 |

EXAMPLE 8 AND COMPARATIVE EXAMPLE 9

A mixture of 12% by weight of the block copolymer obtained in Example 1 and 88% by weight of a polystyrene (Toporex-525, a trade name of Mitsui Toatsu) was prepared, and a sheet with a thickness of 0.2 mm was formed from said mixture at a molding temperature of 180° C. and examined on physical properties thereof.

For comparison, physical properties of said polystyrene alone were also examined.

Results are shown in Table 4.

TABLE 4

|  |  | Impact resistance of sheet (Kg-cm/mm) | Tensile strength (Kg/cm²) | Elongation (%) | Haze (%) |
|---|---|---|---|---|---|
| Example 8 | Polystyrene/ the Block copolymer (88/12, weight ratio) | 20 | 320 | 21 | 31 |
| Comparative Example 9 | Polystyrene | 11 | 70 | 3 | 2 |

EXAMPLE 9

Into an autoclave provided with a stirrer and a jacket, which had been washed and dried, were charged 5,000 g of cyclohexane and 1 g of tetrahydrofuran under a nitrogen atmosphere, after which the interior temperature of the autoclave was raised to 70° C.

Subsequently, to the mixture obtained was added a hexane solution of 0.64 g of n-butyllithium, whereafter 300 g of styrene was added and polymerized at 70° C. for 60 minutes. The conversion of styrene was 100%.

Subsequently, a mixture of 50 g of styrene and 125 g of butadiene was added, and polymerization was carried out at 70° C. for 60 minutes. The conversions of styrene and butadiene were 100%. This operation was further repeated twice. Then, 125 g of butadiene was added, and polymerization was carried out at 70° C. until the conversion reached 100%. Thereafter, 300 g of styrene was further added, and polymerization was carried out at 70° C. or 60 minutes. The conversion was 100%. The temperature was controlled during the polymerization so that it was always kept at 70° C. After completion of the polymerization, 2,6-di-tert-butyl-p-cresol was added to the polymer solution, and thereafter, the cyclohexane was removed by heating, thereby obtaining a block copolymer.

EXAMPLES 10 TO 12, AND COMPARATIVE EXAMPLES 10-14

Polymerization was carried out with the same recipe as in Example 9 under the same conditions as in Example 9, except that styrene, butadiene and tetrahydrofuran were used in the amounts shown in Table 5 and that the addition and polymerization of butadiene alone in the B portion was omitted.

Table 6 shows the molecular characteristics of the block copolymers obtained.

Table 7 shows the results of evaluation of the physical properties of the block copolymers obtained.

TABLE 5

| | Polymerization Formulation | | | | | |
|---|---|---|---|---|---|---|
| | Styrene (g) | | | | | |
| | Initial styrene content in A portion | Styrene content in B portion | Post-added styrene content in A portion | Amount of butadiene (g) | Amount of tetrahydrofuran (g) | Number of additions of monomer in B portion |
| Example | | | | | | |
| 9 | 300 | 150 | 300 | 500 | 1 | 4 |
| 10 | 450 | 225 | 450 | 125 | 1 | 6 |
| 11 | 375* | 188* | 375* | 313 | 1 | 2 |
| 12 | 375** | 188** | 375** | 313 | 1 | 2 |
| Comparative Example | | | | | | |
| 10 | 225 | 50 | 225 | 750 | 1 | 3 |
| 11 | 375 | 475 | 375 | 25 | 1 | 3 |
| 12 | 325 | 250 | 325 | 350 | 75 | 3 |
| 13 | 425 | 200 | 425 | 200 | 1 | 12 |
| 14 | 400 | 200 | 400 | 250 | 1 | 1 |

Note:
*p-Methylstyrene was used in place of the styrene.
**α-Methylstyrene was used in place of the styrene.

TABLE 6

| | Molecular Properties | | | | |
|---|---|---|---|---|---|
| | Total combined styrene content (%) | Combined styrene content in B portion (%) | Proportion of styrene chain of n being 1-4 (%) | Molecular weight of A portion (× 10⁴) | Molecular weight of B portion (× 10⁴) |
| Example | | | | | |
| 9 | 60 | 23 | 13 | 3.3 | 7.2 |
| 10 | 90 | 64 | 15 | 5.0 | 3.9 |
| 11 | 75 | 37 | 17 | 4.2 | 5.6 |
| 12 | 75 | 37 | 18 | 4.2 | 5.6 |
| Comparative Example | | | | | |
| 10 | 40 | 6 | 7 | 2.5 | 8.9 |
| 11 | 98 | 95 | 21 | 4.2 | 5.6 |
| 12 | 72 | 42 | 28 | 3.6 | 6.7 |
| 13 | 84 | 50 | 14 | 4.7 | 4.4 |

TABLE 6-continued

| | Molecular Properties | | | | |
|---|---|---|---|---|---|
| | Total combined styrene content (%) | Combined styrene content in B portion (%) | Proportion of styrene chain of n being 1-4 (%) | Molecular weight of A portion ($\times 10^4$) | Molecular weight of B portion ($\times 10^4$) |
| 14 | 80 | 44 | 16 | 4.4 | 5.0 |

TABLE 7

| | Evaluation Results of Physical Properties | | | | | |
|---|---|---|---|---|---|---|
| | Tensile strength (kg/cm$^2$) | Elongation at break (%) | Izod impact strength (notched) (kg-cm/cm) | Rockwell hardness (R scale) | Total light transmission (%) | Haze (%) |
| Example | | | | | | |
| 9 | 270 | 530 | 7.5 | 35 | 89 | 4 |
| 10 | 430 | 21 | 3.1 | 114 | 91 | 3 |
| 11 | 350 | 54 | 3.9 | 88 | 88 | 4 |
| 12 | 340 | 56 | 4.0 | 87 | 89 | 4 |
| Comparative Example | | | | | | |
| 10 | 180 | 800 | immeasurable | too low to measure | 87 | 4 |
| 11 | 400 | 5 | 1.2 | 119 | 89 | 4 |
| 12 | 290 | 43 | 1.8 | 83 | 91 | 4 |
| 13 | 300 | 34 | 2.1 | 97 | 88 | 3 |
| 14 | 330 | 14 | 2.4 | 94 | 89 | 4 |

Example 9: Example wherein the total combined styrene content is 60%, the combined styrene content in the B portion is 23%, and the monomer in the B portion is added 4 times.

Example 10: Example wherein the total combined styrene content is 90%, the combined styrene content in the B portion is 64%, and the monomer in the B portion is added 6 times.

Example 11: Example wherein para-methylstyrene is used in place of the styrene, the total combined para-methylstyrene content is 75%, the combined para-methylstyrene content in the B portion is 37%, and the monomer in the B portion is added twice.

Example 12: Example wherein α-methylstyrene is used in place of the styrene, the total combined α-methylstyrene content is 75%, the combined α-methylstyrene content in the B portion is 37%, and the monomer in the B portion is added twice.

Comparative Example 10: Example wherein the total combined styrene content is 40%.

Comparative Example 11: Example wherein the total combined styrene content is 98%. This falls within broad terms of invention but is comparative in the context of trying to prepare a resin.

Comparative Example 12: Example wherein an excess amount of tetrahydrofuran (6.0 g/100 g of monomer) is added.

Comparative Example 13: Example wherein the monomer in the B portion is added 12 times.

Comparative Example 14: Example wherein the monomer in the B portion is added once As shown in Table 7, the block copolymers in Examples 9-12 are excellent in the balance of impact strength, tensile strength and elongation at break as compared with those in Comparative Examples 10-14.

What is claimed is:

1. An alkenyl aromatic compound-conjugated diene block copolymer having a combined alkenyl aromatic compound content of 25-95% by weight, wherein the block copolymer is represented by the formula;

A—B—A wherein A represents an alkenyl aromatic compound polymer block, the total amount of said A in both ends being 50-97% by weight of the total combined alkenyl aromatic compound content, and B represents a conjugated diene-alkenyl aromatic compound copolymer block, and a homopolymer block of a conjugated diene homopolymer selected from the group consisting of polybutadiene, polyisoprene and polypiperylene, said conjugated diene-alkenyl aromatic compound copolymer block having (a) 2-10 taper blocks in which the amount of the alkenyl aromatic compound increases gradually and (b) a weight ratio of alkenyl aromatic compound/conjugated diene of 3-85/97-15, and wherein the total amount of the alkenyl aromatic compound monomers having a chain of 1-4 molecules in the polymer block is 5-30% by wt. of the total combined alkenyl aromatic compound content.

2. The alkenyl aromatic compound-conjugated diene block copolymer according to claim 1, wherein the weight ratio of alkenyl aromatic compound/conjugated diene in B is 5-60/95-40.

3. The alkenyl aromatic compound-conjugated diene block copolymer according to claim 1, wherein the total amount of A's in both ends is 70-97% by weight of the total combined alkenyl aromatic compound content.

4. The alkenyl aromatic compound-conjugated diene block copolymer in the form of a resin according to claim 1, wherein the combined alkenyl aromatic compound content in the copolymer is more than 55% by weight but not more than 95% by weight.

5. The alkenyl aromatic compound-conjugated diene block copolymer according to claim 1, wherein the B portion has 3-10 taper blocks in each of which the amount of the alkenyl aromatic compound increases gradually.

6. The alkenyl aromatic compound-conjugated diene block copolymer in the form of an elastomer according to claim 1, wherein the combined alkenyl aromatic compound content in the copolymer is 25-55% by weight, and the weight ratio of alkenyl aromatic compound/conjugated diene in the B portion is 3-15/97-85.

7. The alkenyl aromatic compound-conjugated diene block copolymer according to claim 4, wherein the total amount of the chains by which 1-4 alkenyl aromatic compound monomers are linked is 5-25% by weight of the total combined alkenyl aromatic compound content.

8. The alkenyl aromatic compound-conjugated diene block copolymer according to claim 4, wherein the combined alkenyl aromatic compound content in the copolymer is 60-90% by weight.

9. The alkenyl aromatic compound-conjugated block copolymer in the form of a resin according to claim 4, wherein the total amount of said A in both ends is 70-97% by wt. of the total combined alkenyl aromatic compound content, and the total amount of the alkenyl aromatic compound monomers having a chain of 1-4 molecules in the polymer block is 5-25% by wt. of the total combined alkenyl aromatic compound content.

10. The block copolymer according to claim 1, 4 or 6, wherein the weight average molecular weight of said block copolymer is 10,000-800,000.

11. The block copolymer according to claim 1, 4 or 6, wherein the weight average molecular weight of said block copolymer is 50,000-500,000.

12. The block copolymer according to claim 11, wherein the weight average molecular weight of the A portion is 3,000-150,000, and the weight average molecular weight of the B portion is 5,000-340,000.

13. The block copolymer according to claim 1, 4 or 6, wherein the alkenyl aromatic compound is styrene, α-methylstyrene, p-methylstyrene, m-methylstyrene, o-methylstyrene, p-tert-butylstyrene, dimethylstyrene or vinylstyrene.

14. The block copolymer according to claim 1, 4 or 6, wherein the alkenyl aromatic compound is styrene.

15. The block copolymer according to claim 1, 4 or 6, wherein the conjugated diene is butadiene, isoprene or piperylene.

16. The block copolymer according to claim 1, 4 or 6, wherein the conjugated diene is butadiene.

17. The block copolymer according to claim 14, wherein the conjugated diene is butadiene.

18. The alkenyl aromatic compound-conjugated diene block copolymer according to claim 1, wherein the amount of conjugated diene/alkenyl aromatic compound in each of the 2-10 taper blocks is the same.

19. The alkenyl aromatic compound-conjugated diene block copolymer according to claim 1, wherein the weight ratio of alkenyl aromatic compound/conjugated diene in said conjugated diene-alkenyl aromatic compound copolymer block is 3-64/97-36.

* * * * *